United States Patent

Chana

[15] 3,638,771
[45] Feb. 1, 1972

[54] AUTOMATIC TRANSMISSION AND CONTROLS

[72] Inventor: Howard E. Chana, Flint, Mich.
[73] Assignee: General Motors Corporation, Detroit, Mich.
[22] Filed: July 30, 1970
[21] Appl. No.: 59,467

Related U.S. Application Data

[63] Continuation-in-part of Ser. No. 880,779, Nov. 28, 1969.

[52] U.S. Cl. ..................192/3.33, 74/645, 74/869, 192/3.52
[51] Int. Cl. ..............F16d 67/00, F02d 11/02, B60k 17/02
[58] Field of Search ..................74/645, 869; 192/.032, 3.26, 192/3.29, 3.31, 3.52, 3.57, 3.33

[56] References Cited

UNITED STATES PATENTS

| | | | |
|---|---|---|---|
| 3,001,415 | 9/1961 | Smirl | 74/645 X |
| 3,463,033 | 8/1969 | Fisher | 192/3.26 X |
| 3,465,856 | 9/1969 | Biabaud | 192/3.33 |
| 3,541,893 | 11/1970 | Dyke et al. | 192/3.3 X |

Primary Examiner—Allan D. Herrmann
Attorney—W. E. Finken, A. M. Heiter and Charles R. White

[57] ABSTRACT

Power transmission having torque converter drivingly connected to a planetary gear unit conditionable by selective engagement of friction drive establishing devices to provide for four forward drives and one reverse drive. A converter clutch normally held from engagement by the feed of fluid into the converter through a clutch control chamber can be engaged by converter pressure in response to an upshift signal and subsequent exhaust of fluid from the control chamber to permit mechanical drive of the gear unit. A shift valve forming part of hydraulic controls provides a signal pressure to open a converter feed restrictor valve to permit the converter to be fed with operating oil through a second feed passage. The signal from this valve also activates an accumulator valve system which controls the engagement of the converter clutch so that converter clutch capacity is gradually increased to a maximum. There is a detent valve which provides for 3-2 and 4-3 part throttle downshifts and 4-2, 3-2 and 2-1 full throttle downshifts.

12 Claims, 5 Drawing Figures

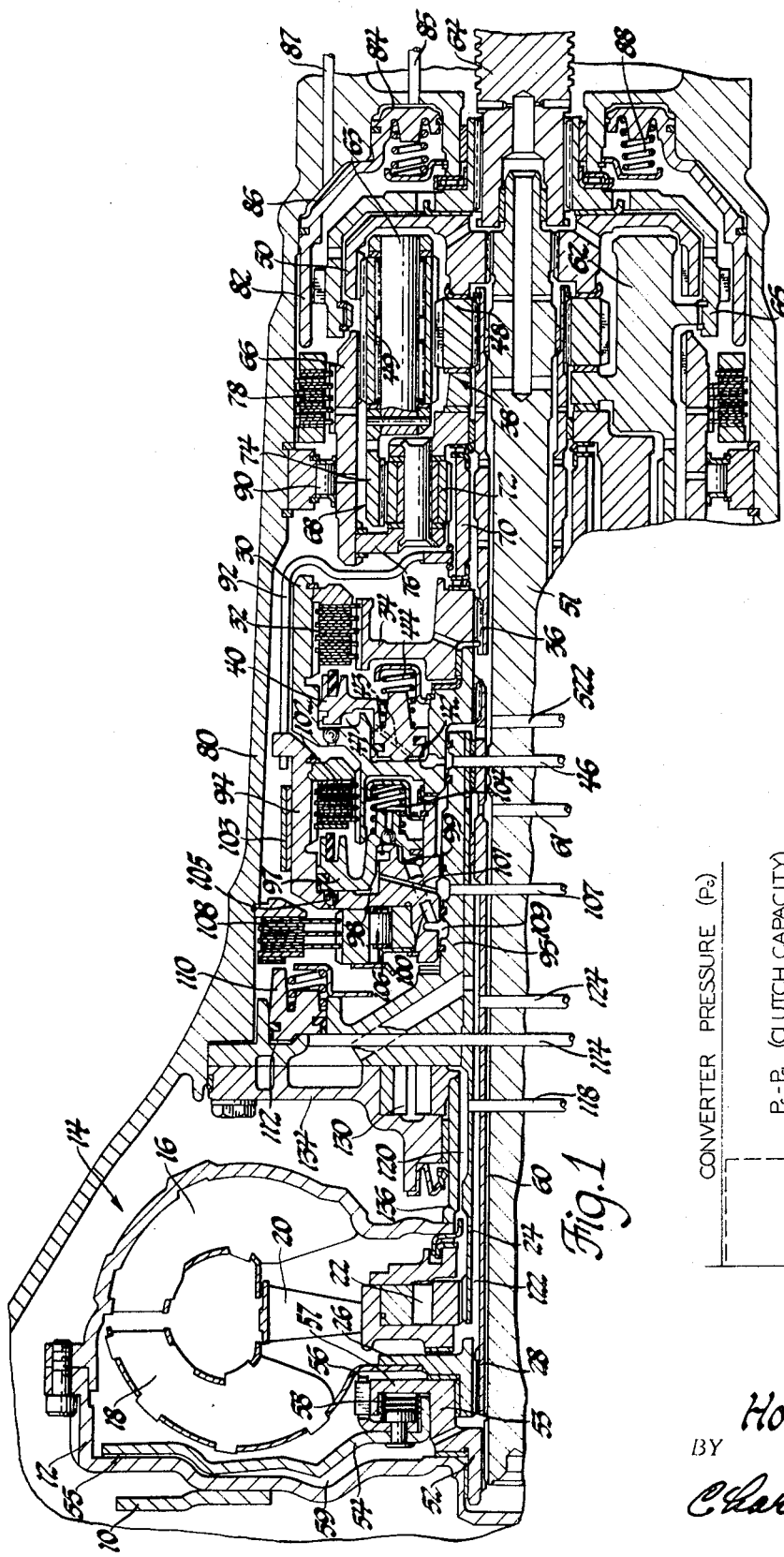
Fig.1
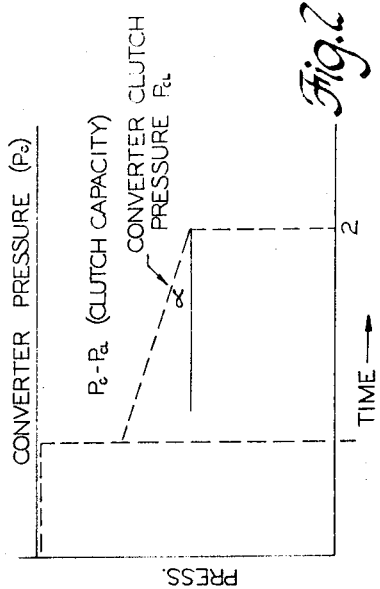
Fig.2
Fig.4a | Fig.4b
Fig.3
INVENTOR.
Howard E. Chana
BY
Charles R. White
ATTORNEY INVENTOR.
Howard E. Chana
BY Charles R. White
ATTORNEY

AUTOMATIC TRANSMISSION AND CONTROLS

This application is a continuous-in-part of my earlier application, Ser. No. 880,779, filed Nov. 28, 1969.

This invention relates to automatic transmissions and controls which provide for automatic all hydraulic, split torque or all mechanical drive. More particularly, this invention relates to advanced hydraulic controls for the transmission gearing and for the control of a front clutch using converter pressure.

Automatic transmissions with a large number of gear ratios have employed a front clutch for mechanical drive of planetary gearing to produce an overdrive ratio and to cooperate with torque converter drive of the gearing to produce split torque drives. The gearing, clutches and brakes and hydraulic controls comprising such transmissions have generally been highly complex, expensive and therefore impractical for mass production and have not had wide-spread usage. In may cases a special planetary gear unit had to be employed for an overdrive ratio greatly adding to the transmission weight and complexity. This invention provides for new and improved torque converter, converter clutch, planetary gear unit and controls to produce all hydraulic low and intermediate drives, a split torque 1:1 drive and an all mechanical overdrive. This invention utilizes only simple planetary gearsets, a minimum number of friction drive establishing devices and uncomplicated controls providing a highly suitable transmission for quantity production. The converter clutch is engaged by the force of converter pressure to provide for mechanical drive into the planetary gear unit to improve efficiency of transmission operation for vehicle cruising. The controls include 1-2, 2-3 and 3-4 shift valves which respond to torque demand and vehicle speed signals by upshifting and downshifting for automatic operation of the transmission. Operating oil is fed to the converter from the 2-3 shift valve when downshifted through a control chamber for the front clutch to effect release of the front clutch so that first and second range drives are all converter drives. When upshifted, the 2-3 shift valve provides a signal that opens a restrictor valve so that fluid is fed to the converter through a second feed passage. An accumulator valve system controls the engagement of the converter clutch to provide improved shifting into direct drive. After the 2-3 shift valve signals an upshift, the control fluid from the clutch chamber is gradually exhausted so that the clutch capacity gradually increases to a maximum when the accumulator has obtained its maximum capacity. The controls include a detent valve which modifies the shift schedule of the transmission and provides for 3-2 and 4-3 part-throttle downshifts and 4-2, 3-2 and 2-1 wide-open-throttle downshifts. Low, intermediate and reverse drives may be manually selected by moving the manual valve to predetermined positions to set the automatic controls for these respective operations.

These and other features, advantages and objects of the invention will become more apparent from the following detailed description and drawings in which:

FIG. 1 is a longitudinal sectional view of a portion of the transmission.

FIG. 2 is a chart which illustrates operation of the converter clutch of this transmission.

FIG. 3 is a diagram showing how FIGS. 4a and 4b are to be placed to illustrate a complete transmission control.

FIG. 4a is a diagrammatic view of a first part of the transmission control of this invention.

FIG. 4b is a diagrammatic view of a second part of the transmission control of this invention.

Figure 4A:
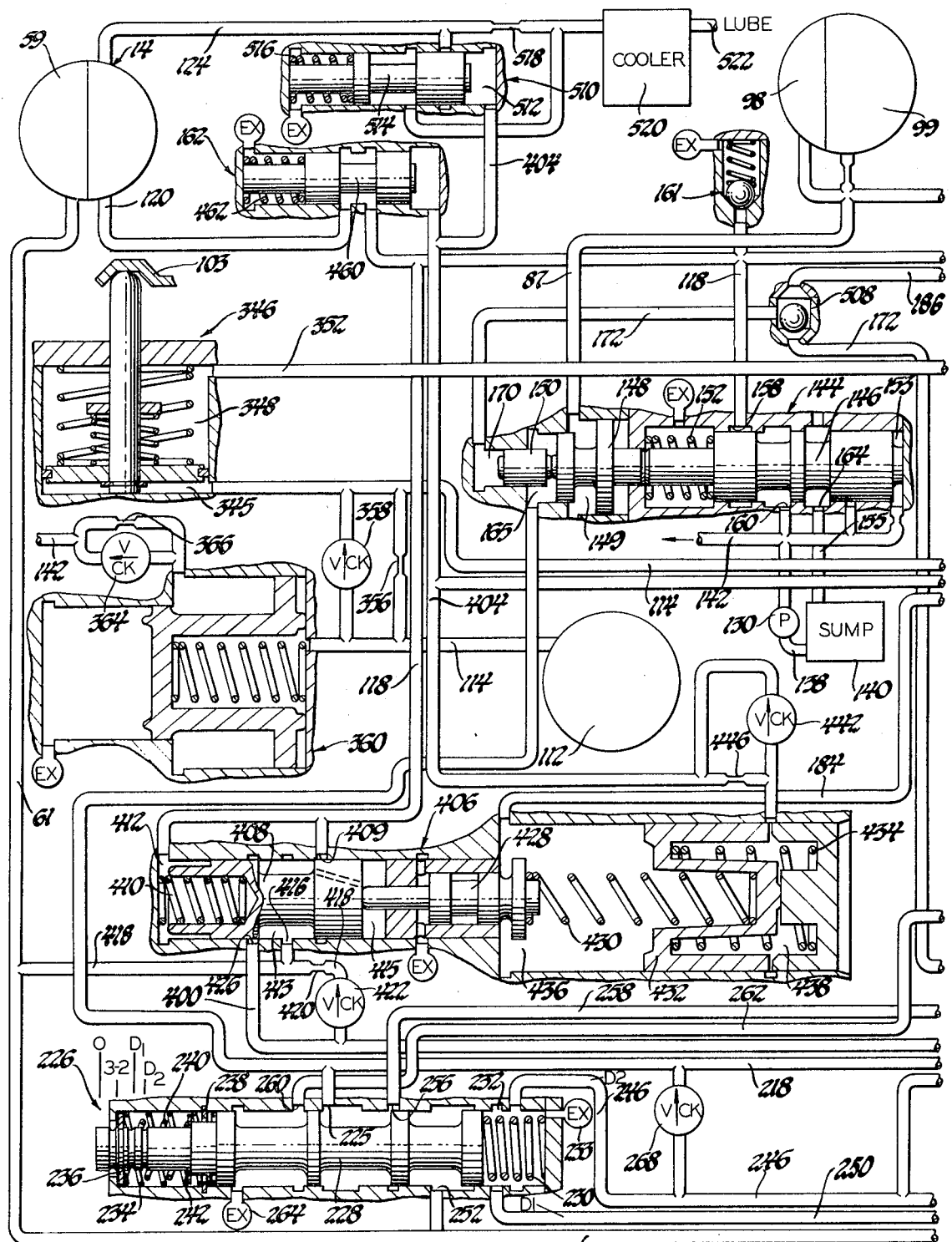
Figure 46:
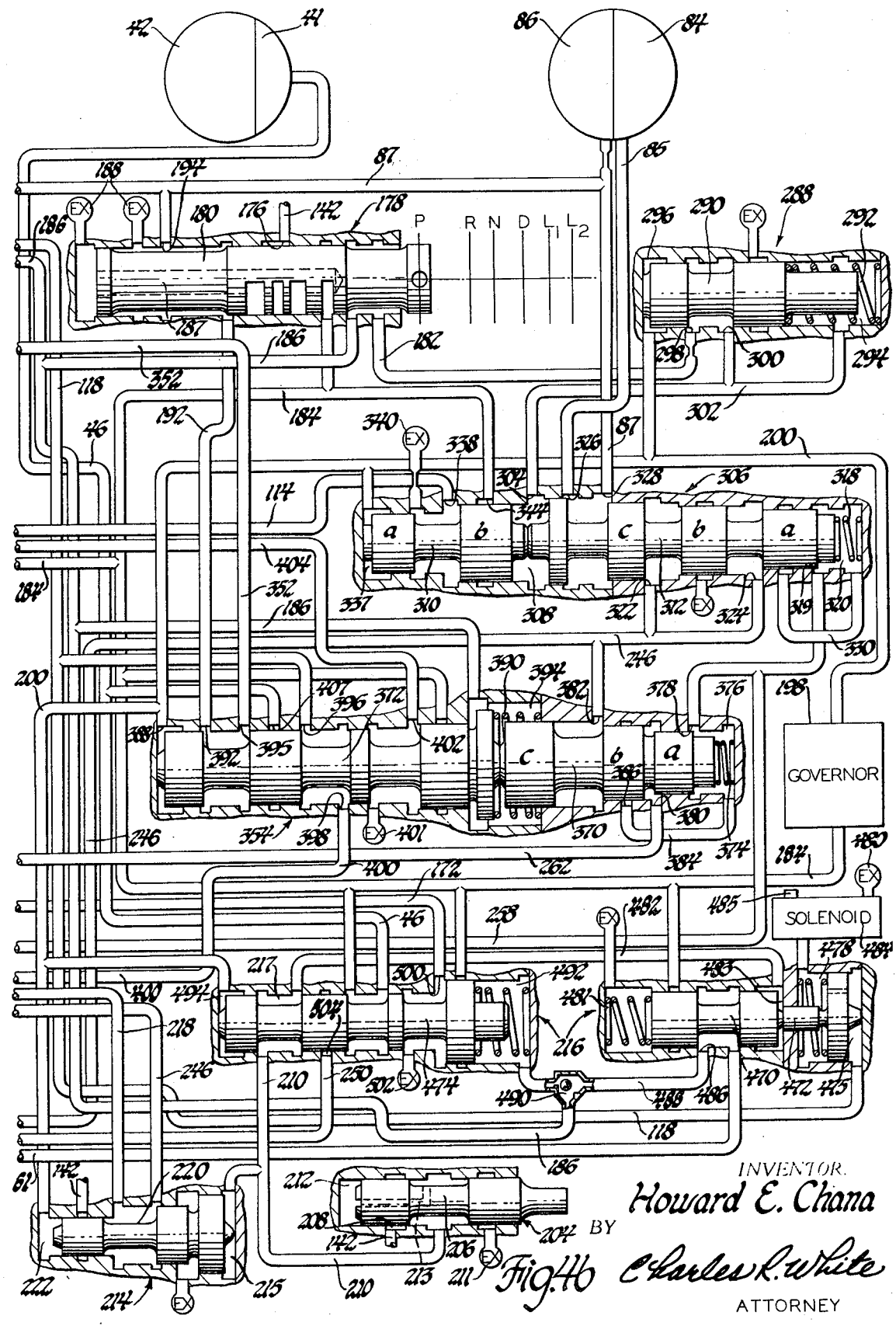

As shown in FIG. 1 this transmission has an input 10 which is drivingly connected to the front cover of a housing 12 of a hydrodynamic torque converter 14. The torque converter has a bladed pump 16 operatively connected to housing 12 and has a bladed turbine 18 and stator 20. The stator is connected through a one-way brake 22 to a ground sleeve 24. The turbine 18 is drivingly connected to the flange of a hub 26 which is splined to a sleeve shaft 28. Sleeve shaft 28 extends rearwardly in the transmission and is splined to the inner hub of an annular drum 30. This drum houses the friction plates of a forward drive clutch 32 having drive plates splined to the interior wall of the drum and having driven plates, disposed between the drive plates, splined to the outer periphery of annular plate support hub 34. The support hub is splined to an intermediate sleeve shaft 36 which drives a first planetary gearset 38.

An annular piston 40 is housed in drum 30 and cooperates therewith to form clutch apply chambers 41 and 42 connected by restricted passage 43. When working fluid under pressure is supplied to chambers 41 and 42 through forward clutch line 46, the piston will move axially to effect engagement of forward clutch 32. By virtue of the restricted passage 43, chamber 41 gradually fills with this fluid to increase clutch capacity. This dual capacity clutch construction provides for softer and better timed shifts particularly a 4-3 downshift when the chambers are exhausted. Spring 44 is a return spring supported in drum 30 for engaging and moving the piston from engagement with clutch 32 when the pressure fluid in the apply chambers is exhausted.

The intermediate shaft 36 is splined to the sun gear 48 of the first planetary gearset 38. This gearset has elongated planet gears 49 which mesh with the sun gear 48 and also with a ring gear 50 which has an inner hub portion splined to the end of a drive shaft 51. This drive shaft extends longitudinally in the transmission and has its forward end splined to a front annular hub 52. This hub has an annular shoulder 53 that slidably supports a disklike plate 54 having an outer annular friction member that is engageable and disengageable with a friction surface on the inside of the front cover of the converter housing 12 to provide a front clutch 55. The plate 54 carries a series of rearwardly projecting fingers 56 that extend into openings formed in a radial flange 57 of the hub 52 to drivingly connect the friction plate and the hub and the drive shaft 51. Tickle spring 58 trapped between the flange 57 and the friction plate 54 urges the friction plate forwardly so that the clutch 55 has a positive engagement bias at all times. The friction plate 54 and the front cover of the converter housing form a chamber 59 which is connected by a passage 60 to a converter clutch line 61. Operating fluid when supplied to the converter through line 61, passage 60 and chamber 59 effects disengagement of clutch 55 while feeding the converter.

The planetary gearset 38 has a carrier 62 which fixedly supports pivot pins 63 on which planet gears 49 are rotatably mounted. The planetary carrier is rigidly secured to the interior of an output shell 65 which is splined to a rearwardly extending output shaft 64. Also, this planetary gearset has a second ring gear 66 meshing with planet gears 49 which has a forwardly extending portion that surrounds a second planetary gearset 68 disposed adjacent to the planetary gearset 38.

Planetary gearset 68 has a sun gear 70 which meshes with the planet gears 72 that in turn mesh with the ring gear 74. Ring gear 74 extends rearwardly and is connected to the carrier 62 of the first gearset while the carrier 76 of planet gears 72 of the second gearset is rigidly secured to the interior of the extension of ring gear 66.

A multiplate low and reverse friction brake 78, disposed between ring gear 66 and the interior of transmission housing 80, is engageable by a hydraulically operated piston 82 to connect the ring gear to the housing to establish low and reverse drive ratios as will be further explained below. This piston is movably mounted in the rear of the transmission housing and cooperates therewith to form separate pressure chambers 84 and 86 connected to low and reverse line 85 and reverse line 87 respectively of the transmission controls. For manual low speed drives, chamber 84 is supplied with pressurized working fluid to effect the movement of piston 82 and the engagement of brake 78. For reverse, higher reaction torques are needed and the torque capacity of brake 78 is increased by charging both chambers with working fluid. Return springs 88 secured to housing 80 move the piston to the off position when the apply chambers are exhausted.

Disposed adjacent to multiplate brake 78 is a one-way brake 90 operatively connected to the outer periphery of ring gear 66 and the interior of the transmission housing. This brake automatically engages to prevent the reverse rotation of the ring gear 66 and the carrier 76 and automatically disengages to allow these elements to rotate forwardly.

The sun gear 70 of the second planetary gearset has a forwardly extending sleeve portion concentric with sleeve shaft 36 and this sleeve portion is connected to a sheet metal drum 92 that extends forwardly around drum 30. As shown, drum 92 has extending tabs or projections which fit in special openings formed in an annular flange portion of a drum 94 which is rotatably mounted on an inner-extending shoulder portion 95 of the transmission housing. The drum houses a piston 97 which forms pressure chambers 98 and 99 within the drum 94 connected by passages 100 and 101 to reverse passage 109 and reverse clutch line 107 respectively. Apply oil when fed by the controls to chamber 99 or both chambers 98 and 99, causes the piston to engage a multiplate reverse drive clutch 102. This clutch has driven plates splined to the interior of drum 94 and drive plates interleaved with the driven plates and splined to an annular shoulder extending forwardly from drum 30. The engagement of clutch 102 connects drums 94 and 30 together. Return springs 104 secured to drum 94 engage the piston 97 to move it to an off position when chambers 98 and 99 are exhausted. Conventional ball dump valves such as valve 105 are employed in this transmission. This valve opens to exhaust chamber 98 when the drum 94 is rotating to prevent residual centrifugal oil from effecting movement of piston 97 and engagement of clutch 102. There is an annular brake band 103 which is operated by a servomechanism for selectively engaging drum 94 to hold it from rotation when establishing predetermined ratios.

Mounted on a forwardly extending collar portion of drum 94 is the inner race of a one-way clutch 106. There is also a multiplate intermediate brake 108 having a first series of plates splined to the outer race of this one-way device and a second series of plates splined to the interior of housing 80. Piston 110 slidably mounted on an interior shoulder of transmission housing 80 engages the brake 108 when the pressure chamber 112 formed by this piston and the housing is charged with apply pressure through intermediate clutch line 114. Suitable return spring means supported on the transmission case are employed to move piston 110 to an inactive or off position when the associated apply chamber is exhausted.

Instead of being supplied with working fluid through passage 60 the converter 14 may also be supplied with working fluid through feed line 118 and passage 120. In both cases converter discharge is through passage 122 into converter out passage 124.

With the invention as shown and described a plurality of forward drive ratios, a neutral and a reverse drive ratio can be readily obtained. The schedule of engagement of the clutches and brakes to obtain these ratios is set forth in the following chart:

When the transmission is set for automatic drive, first, second, third and fourth speed ratios are automatically selected in accordance with torque demand and vehicle speed signals. When torque requirements are high as when initially moving the vehicle, forward clutch 32 is applied. Turbine torque is transmitted by clutch 32 through sleeve shaft 36 to the sun gear 48 of the planetary gearset 38. Ring gear 66 will be held by the one-way brake 90 and the carrier 62 will be driven forwardly at low speed in the largest reduction ratios such as listed in the schedule. The one-way clutch 106 locks but this does not affect the drive since brake 108 is released at this time.

As vehicle speed increases and torque demand decreases the transmission upshifts into second gear. In this gear the intermediate brake 108 is applied in addition to forward clutch 32 as shown in the schedule. Under these conditions the outer race of one-way clutch 106 is grounded and this one-way device locks to hold sun gear 70 for reaction. With ring gear 74 rotating forwardly and with sun gear 70 held, the planet gears 72 will be driven forwardly. The output speed of ring gear 74 and connected output shaft 64 increase as the planet gears walk on the stationary sun gear 70 to produce an intermediate speed ratio. During this drive the one-way brake 90 overruns. For a preferred split torque direct drive indicated as drive 3, the front clutch 55 and forward clutch 32 are applied. Under these conditions sun gear 48 will be driven by the converter and ring gear 50 will be driven mechanically to produce a ratio of 1:1. This drive will be two-thirds mechanical and one-third hydraulic. The intermediate brake 108 is on but has no effect on this drive since the one-way clutch 106 overruns.

For a torque converter direct or third range drive, clutches 102 and 32 are applied as indicated by optional drive 3A. Under these conditions the sun gears 70 and 48 are connected and the planetary gearset is locked up for rotation as a unit in a ratio of 1:1. Intermediate brake 108 is on but has no effect on this operation since the one-way clutch 106 overruns.

If an all mechanical direct drive is desired the front clutch 55 is additionally engaged as indicated in optional drive 3B. With the gearset locked and driven mechanically through the clutch 55 there is no converter slippage and operating efficiency is improved.

For overdrive, front clutch 55 and brake band 103 are engaged. With sun gear 70 held for reaction and ring gear 50 mechanically driven forwardly, an all mechanical overdrive is produced with the carrier 62 and output shaft rotating faster than input 10.

For low hold, forward clutch 32 and brake 78 are applied. With sun gear 48 driven forwardly by the converter and ring gear 66 held for reaction the carrier 62 and connected output shaft will be driven forwardly at the low speed ratio. Since brake 78 is engaged the ring gear 66 is held from rotation so that it cannot overrun the one-way brake 90 to prevent free wheeling under coast conditions for engine braking. As shown in the schedule, one-way brake 90 is on to assist in holding the ring gear from reverse rotation.

For intermediate hold, forward clutch 32 is engaged to transmit converter torque to sun gear 48 and brake band 103 is engaged with drum 94 to hold sun gear 70 for reaction. Under these conditions the two carriers 62 and 76 compound so that forward rotation of sun gear 48 results in forward-medium speed drive of the carrier 62 and the connected output shaft 64. The application of brake band 103 prevents freewheeling of the one-way device 106 under predetermined coast conditions.

For reverse, brake 78 and clutch 102 are engaged. Under these conditions with sun gear 70 driven forwardly and with carrier 76 held for reaction, the ring gear 74 and the connected output shaft are driven in a reverse direction at a reduced speed.

In neutral all clutches and brakes are released and the gearset is stationary for any input speed.

In the preferred embodiment sun gear 70 has 38 teeth, ring gear 74 has 74 teeth, sun gear 48 has 46 teeth and ring gears

| Range | Friction elements | | | | | | | | Converter | Example ratio |
|---|---|---|---|---|---|---|---|---|---|---|
| | 55 | 102 | 32 | 108 | 78 | 103 | 106 | 90 | | |
| Neutral | | | | | | | | | | |
| Automatic drive: | | | | | | | | | | |
| 1 | | | On | | | | Lock | Lock | Open | 2.87/1 |
| 2 | | | On | On | | | do | Or | do | 1.64/1 |
| 3 | On | | On | On | | | Or | Or | Split torque | 1/1 |
| 3A (option) | | On | On | On | | | Or | Or | Open | 1/1 |
| 3B (option) | On | On | On | On | | | Or | Or | Locked | 1/1 |
| 4 | On | | | On | | On | Or | Or | do | .66/1 |
| Low | | | On | | On | | Lock | Lock | Open | 2.87/1 |
| Intermediate | | | On | On | | On | do | Or | do | 1.64/1 |
| Reverse | | On | | | On | | | | do | −1.94/1 |

66 and 50 have 86 teeth each to produce the example gear ratios listed above. Other beneficial ratios can be readily produced by appropriately changing the teeth numbers of the gearing components.

The hydraulic controls of this invention include an internal-external gear-type pump 130 disposed immediately behind the torque converter pump within a pump housing 134 disposed in the transmission housing 80. The external gear of the pump is keyed to a sleeve 136 of the converter pump 16 so that the pump pumps transmission oil whenever the engine is operating.

As shown schematically in FIGS. 4a and 4b the pump has an intake connected to suction line 138 which is connected to an oil strainer assembly and sump 140. Oil is delivered by the pump into main line 142. Oil pressure in the control system is controlled by a pressure regulator valve 144 which is spring balanced to regulate line pressure at a predetermined value. The regulator valve has a main valve element 146, a modulator trim and reverse boost element 148 forming a boost chamber 149 connected to reverse line 87, and a pressure boost plug 150. Minimum regulated line pressure is controlled by a centrally disposed spring 152 which is seated in the bore of valve 144 and which has a free end engaging the end of the main valve element 146. Main line pressure is fed to a chamber 153 located in one end of the regulator valve to exert a force on the main valve element 146 which opposes the force exerted by the spring 152. As the pressure builds up in the chamber 153, the main valve element 146 moves down against the spring 152 to reduce line pressure by exhausting pressure fluid to suction line 155 connected to the sump 140. The movement of this valve element opens converter feed port 158 and connected converter feed line 118 to a main pressure port 160 connected to the main line 142. The converter feed line 118 is connected to a converter blow-off valve 161 and also into the passage 120 through a converter feed restrictor valve 162. If main line pressure continues to increase in chamber 153, the valve element will open pressure port 160 to an exhaust port 164 connected to the suction line 155 leading into sump 140. If the pressure in the main line drops, the spring 152 will move the main valve element 146 into a position blocking main line pressure port 160 from the exhaust port 164 to effect a main line pressure rise. To provide for increased regulated pressure, the modulator trim and reverse boost valve element can be moved to exert a force on the main regulator valve tending to close main line pressure port 160 from exhaust port 164 regardless of line pressure. This occurs when there is a supply of a reverse pressure through reverse line 87 to act on the differential area of the lands of the boost element 148. Also, pressure from a modulator trim valve which will be later described, can be supplied to a pressure chamber 165 formed between boost element 148 and plug 150. When this chamber is charged with pressure oil, an additional force is exerted on the main valve element 146 to increase main line pressure. The regulated pressure can also be increased by supply of a boost pressure to chamber 170 behind boost plug 150 through boost line 172. The force exerted by this boost pressure urges the plug 150 and valve element 148 against the end of the main regulator valve element 146 moving it toward the illustrated position. In this position the suction line 155 is blocked from pressure port 160 and the main line pressure is thereby increased.

Regulated main line pressure is routed through line 142 into a port 176 of a manual valve 178 which has a valve element 180 axially shiftable by a manual selector lever or other selector mechanism. The manual valve element is movable to the illustrated position $L_2$, $L_1$, D, N, R, P which correspond to low, intermediate, drive, neutral, reverse and park, respectively.

In the the $L_2$ or low range position the manual valve element 180 connects main line pressure to a low control line 182, a drive line 184 and an intermediate line 186. In the $L_1$ or intermediate position of the manual valve element, main line pressure is connected to the drive and intermediate lines. The low pressure line is exhausted through passage 187 in the manual valve element and exhaust ports 188. In the drive position D the manual valve element is shifted to a position in which main line pressure is connected to a reverse-neutral-drive or RND-line 192 and to drive line 184. The intermediate and low lines are exhausted through passage 187 and exhausts 188. In the neutral position the main line pressure port 176 is connected to the RND-line 192 and all of the other lines connected into the manual valve are exhausted. In reverse position the main line pressure is connected to a reverse port 194 connected to reverse line and the RND-line 192 and the other lines are opened to exhausts 188. In part, the main line pressure port 176 is blocked by the shifted manual valve element and all other lines are exhausted.

Vehicle speed signal for automatic shifting is supplied by a suitable transmission governor 198 such as the governor shown in Pat. application, Ser. No. 811,439 to Henri J. Van Lent et al., filed Mar. 28, 1969, now U.S. Pat. No. 3,541,887 which is driven by the transmission output shaft 64. The governor is fed with drive oil from the manual valve through line 184 and provides a governor pressure into governor line 200.

To provide a variable engine torque signal the controls include a modulator valve 204 in which a modulator valve element 206 operating as a simple regulating valve converts modulator force into a hydraulic modulator pressure. This valve has inlet port 208 connected to main line 142, a modulator outlet port connected to modulator line 210 and has an exhaust 211. An engine torque signal is exerted on one end of the modulator valve element 206 by a suitable vacuum modulator such as that disclosed in the above-identified U.S. application, Ser. No. 811,439 to Henri J. Van Lent et al.

Modulator pressure is fed into end chamber 212 of the modulator valve through a suitable passage 213 in the modulator valve element to exert a force opposing that of the vacuum modulator. The modulator force and thus modulator pressure increase with increased engine manifold pressure. Modulator pressure is supplied through the modulator line 210 to an end chamber 215 in a modulator trim valve 214 and to a chamber 217 in a 3-4 shift valve 216.

The modulator trim valve produces a pressure fed to a modulator trim line 218 which is directly proportional to modulator pressure and inversely proportional to governor pressure. This valve has an inlet port connected to main line 142 and a shiftable valve element 220. Governor pressure is fed by governor line 200 to a chamber 222 at one end of the valve element which opposes the force of modulator pressure in chamber 215 effective at the other end of the valve. When modulator pressure is sufficiently high, valve 220 moves to open the inlet or line port to the modulator trim line 218.

Modulator trim pressure is fed by line 218 to the pressure chamber 165 between boost plug 150 and boost valve element 148 in the pressure regulator valve to urge modulator trim and boost valve element to the right against the regulating valve element to effect an increase in line pressure. Also the modulator trim line is connected to an inlet port 225 of a detent valve 226.

The detent valve controls or modifies the shift schedule of the transmission in accordance with engine torque as reflected by throttle control position. With this valve, 3-2 part throttle downshifts, 4-3 part throttle downshifts and wide-open throttle 4-2, 3-2 and 2-1 downshifts are obtained to improve vehicle performance.

The detent valve has a valve element 228 which is operatively connected to the throttle linkage, not shown, and is shiftable between the predetermined positions shown as 0, 3-2, $D_1$ and $D_2$ in accordance with throttle opening. Axial movement of the detent valve element 228 in response to the opening of the throttle is opposed by coil spring 230 disposed in a spring pocket 232 having exhaust 233 at one end of the valve element. This movement is also opposed by an outer spring 234 trapped between a spring support secured to the valve element and a spring seat 238 fixed to the valve housing. There is an inner coil spring 240 disposed between the outer fixed support 236 and an inner support or washer 242 normally seated against a shoulder on the valve element. After predetermined movement of the valve element by the throttle control, washer 242 contacts spring seat 238 and spring 240 adds to the force opposing valve movement by the throttle pedal. As the valve element 228 is moved from the $D_1$ to the $D_2$ position spring 240 establishes a detent feel position to inform the operator that the transmission will be conditioned for wide-open throttle downshifts on further opening of the throttle.

The detent valve also has: (1) a port connected to a detent-2 line 246 leading to the modulator trim valve 214 and into a 1-2 shift valve and a 2-3 shift valve later described, (2) a detent-1 port connected to a detent-1 line 250 leading into the 3-4 shift valve 216, (3) an inlet port 252 connected to the detent pressure regulator valve 254, (4) an outlet port 256 connected to the modulator shift valve line 258, (5) part throttle port 260 connected to a 3-2 part throttle line 262 and (6) an exhaust 264.

In the 3-2 part throttle downshift position the 3-2 part throttle port 260 is connected to the modulator trim inlet port 225. When the valve element is moved further down to the $D_1$ position, the $D_1$ port is connected to the detent regulator port 252 and the 3-2 part throttle port remains connected to the modulator trim inlet port 225. As the valve element 228 moves to the $D_2$ or wide-open throttle position the 3-2 part throttle port 260 remains connected to the modulator trim port but the modulator shift valve port 256 becomes connected to the detent regulator port. The $D_2$ port, which previously was exhausted is also connected to the detent regulator port in this wide-open throttle position of the detent valve element. There is a detent ball check valve 268 disposed between the modulator trim line 218 and detent-2 line 246 which blocks flow from modulator trim line 218 to the detent-2 line; as indicated by the arrow, this valve allows flow from line 246 to line 218. This valve insures that in the $D_2$ position of the detent valve element, modulator trim pressure can be greater than detent regulated pressure but cannot be less than this pressure.

The detent regulator valve 254 provides a regulated pressure for the detent valve. This valve has a valve element 270 shiftable in a bore in the valve housing. This valve has an inlet port 272 connected to main line 142, a detent regulator port 274 connected to the detent regulator line 276 and has an exhaust 278. There is an end chamber 280 which is connected to the detent regulator line 276 and oil from that line is fed into this chamber through a suitable flow control restriction. The force exerted by detent regulator pressure on the valve element is opposed by spring 284 disposed in a spring pocket at the other end of the valve.

As shown in FIG. 4b, the controls include a low control valve 288 which is governor pressure controlled and which limits the speed at which a manual low gear engagement can be made. Once this valve triggers manual low engagement, the transmission will remain in first gear for as long as the pressure port for low control line 182 in the manual valve is pressurized. The valve 288 has a valve element 290 biased in one direction by a spring 292 disposed in an end chamber 294 against the force of governor pressure fed by governor line 200 to an end chamber 296 in the valve. This valve includes an inlet port 298 connected to the low range control line 182. Also low control valve 288 has a manual low port 300 connected to a manual low line 302 that is connected to port 304 of 1-2 shift valve 306. Also the manual low line 302 is connected to the chamber 294 to supply this chamber with pressure when the manual valve is in the $L_2$ position. Thus, in manual low a fluid pressure fed to chamber 294 exerts a force on the valve element 290 additive to the force of spring 292.

The manual low control valve 288 is positioned to exhaust the manual low line 302 when the manual valve is placed in the manual low position and when the vehicle speed is more than a predetermined speed. At speeds below this, low range oil is fed by the low control valve into the manual low line 302.

This pressure oil is fed into a chamber 308 in the 1-2 shift valve between a 1-2 shift valve element 310 and a shift control valve element 312. This pressure moves the 1-2 shift valve element 310 to the downshifted position to exhaust chamber 112 of the intermediate brake 108 as will be further explained below. The pressure in chamber 308 also moves the 1-2 shift control valve element 312 to the upshifted position which sends apply oil to the low and reverse chamber 84. Once the manual low control valve element 290 is in the downshifted position, the spring 292 plus low apply oil acting on the valve element will maintain the valve element in this position. Thus with the transmission in manual low, the transmission cannot upshift regardless of vehicle or engine speed once low gear has been engaged.

The 1-2 shift valve 306 controls the supply of drive line oil to the servomotor for the intermediate brake to cause the transmission to shift between low and second. This valve is controlled by governor pressure acting on shift valve element 310 and modulator shift valve pressure and spring force acting on shift control valve element 312. The spring force on this latter valve element is provided by a spring 318 located in a pressure chamber 320 which engages the shift control valve element and determines the minimum shift speeds.

The hydraulic pressures which control the forces on this valve are modulator shift valve pressure fed to port 319 and to pressure chamber 320 by modulator shift valve line 258 and detent-2 pressure fed into the shift valve through spaced ports 322 and 324. The end area of the right hand spool or land controls the part throttle upshift schedule; the second or next spool has an area that controls the wide open throttle 2-1 downshift point. The area of the third land $c$ controls the wide-open throttle 1-2 upshift. The shift control valve element 312 also supplies hydraulic pressure to the chamber 84 of the low and reverse brake 78 through port 326 and the line 85 leading to the chamber 84 when the transmission is conditioned for manual, low or reverse. This shift control valve has reverse port 328 connected to reverse line 87 leading into chamber 86 of low and reverse brake 78 and leading into chambers 98 and 99 of reverse clutch 102. When shift control valve 312 is upshifted, U-shaped passage 330 connects detent-2 port and detent-2 line 246 to chamber 320 to pressurize chamber 320 to provide for wide-open throttle 2-1 downshifts in response to movement of the detent valve element 228 to the $D_2$ position.

The shift valve element 310 has two lands $a$ and $b$; land $a$ is acted on by governor pressure fed to an end pressure chamber 337 through line 200. The differential area between the two spools gives the valve hysteresis which is an additional force to the right supplied by pressure from drive line 184 when the valve moves to the upshifted position. Thus, this shift valve is controlled by the force of governor pressure plus drive pressure acting on the hysteresis area lands $a$ and $b$ when valve element 310 is in the upshifted position. When the shift valve is in the downshifted position, the 1-2 clutch line 114 connected to port 338 in the 1-2 shift valve is exhausted by an exhaust port 340 having a flow control restriction. As the shift valve moves to the upshifted position, drive pressure through drive line port 344 is connected to the 1-2 clutch line 114 and is fed by this line directly to the apply chamber 345 of a servo 346 which operates brake band 103. The servo has a release chamber 348 connected to a servo control line 352. This control line can be connected to the RND pressure by a 2-3 shift valve 354 when downshifted so that the servo cannot apply brake band 103. The 1-2 clutch pressure supplied through shift valve element 310 to clutch line 114 is transmitted through a 1-2 upshift restriction 356 and the shift check valve 358 to a 1-2 accumulator 360 and to intermediate clutch apply chamber 112. The accumulator 360, 1-2 orifice 356 and apply chamber 112 are combined to give a smooth shift transition from first to second. A 2-1 shift check valve 364 and restriction 366 cooperates with the 1-2 shift check valve 358, restriction 356 and the exhaust port 340 of the 1-2 shift valve to provide control of 2-1 downshifts.

The 2-3 shift valve 354 controls shifts between second and third. This valve has a control valve element 370 and a shift valve element 372. The control valve element transmits the force exerted by a spring 374 disposed in a spring pocket provided by pressure chamber 376 to the shift valve element 372. Modulator shift valve pressure supplied through line 258 is fed to port 378 controlled by the end land $a$ of the control valve element 370. In the downshifted position, this valve element permits modulator shift valve pressure to be fed to the chamber 376 for part throttle upshifting. The force exerted by modulator shift valve pressure on the shift control valve element 370 is relayed to shift valve element 372.

The 3-2 part throttle line 262 is connected to an inlet port 380 between the first and second lands $a$ and $b$ of valve element 370 having an area differential so that 3-2 part throttle pressure urges the shift control valve to the downshift position. Detent-2 pressure from the detent valve through line 246 is fed to a port 382 between the second and third lands $b$ and $c$ to act on the area differential of these lands to urge the control valve element 370 and the shift valve element 372 to a downshifted position. U-shaped passage 384 connecting port 386 with chamber 376 transmits detent-2 pressure from line 246 into chamber 376 when the shift control valve is upshifted. The right side area of the land $a$ controls the part throttle 2-3 upshift schedule up to the 3-2 position of the detent valve. After the 3-2 position of the detent valve, the part throttle upshift schedule becomes controlled by the area of land $b$. The difference in area between mentioned lands $a$ and $b$ controls the 3-2 part throttle downshifts. The area of land $c$ controls the through $D_2$ detent upshifts and downshifts.

The shift valve element 372 has governor pressure from line 200 fed into an end chamber 388 that urges shift valve element 372 to an upshift position. There is a spring 390 disposed in a central chamber 394 acting on an end of the shift valve element 372 opposing the force of governor pressure. The sum of springs 390 and 374 determines the minimum shift speeds.

Intermediate pressure from the manual valve 178 supplied to intermediate line 186 is ported to chamber 394 to move the shift valve to the downshifted position whenever intermediate line 186 is pressurized.

When the shift valve element 372 is downshifted, a RND-port 392 connected to the RND-line 192 is connected to a servo port 395 connected to servocontrol line 352 to pressurize the control chamber 348 of the servo 346.

Converter charge pressure from the pressure regulator valve is fed by line 118 into a port 396 of the 2-3 shift valve. This port is connected to a 2-3 accumulator port 398 for a 2-3 accumulator line 400 when the 2-3 shift valve is downshifted. In this valve position a third signal port 402 connected to third range signal line 404 is exhausted through exhaust 401. When the 2-3 shift valve element 372 moves to the upshifted position, the servo port 395 is connected to a forward clutch port 470 connected to forward clutch line 46 which is pressurized with drive oil from the 3-4 shift valve 216 provided the 3-4 shift valve is in the downshifted position. Under these conditions the servo can not effect the engagement of brake band 103. The 2-3 accumulator port 398 is exhausted and the third signal port 402 which was exhausted becomes pressurized with drive oil. This drive oil also acts on a differential area of the shift valve giving the shift valve hysteresis control. Pressurizing the third signal port 402 and exhausting the 2-3 accumulator ports 398 activates a 2-3 accumulator control valve 406 resulting in a 2-3 shift.

The 2-3 accumulator control valve 406 is provided to control the front clutch 55 so that it engages properly during a 2-3 shift. This clutch is applied when chamber 59 is exhausted and converter pressure acting on plate 54 moves it forwardly to effect the engagement of clutch 55.

The 2-3 accumulator control valve includes a regulator valve 408 which is urged in one direction by a spring 410 disposed in a pocket formed by pressure chamber 412 located at one end of the valve. Converter feed pressure from line 118 is ported into this chamber. This pressure is also fed into chamber 413 through port 409 that is controlled by the first land of regulator valve 408. A suitable passage through this land connects chamber 413 with a control chamber 415. Converter clutch port 416 is connected to converter clutch line 61. This line has a branch line 418, having restriction 420 and check valve 422, leading into the 2-3 accumulator line 400. This latter line is connected to the 2-3 accumulator valve by port 426.

To provide an upshift force on the regulator valve 408 the 2-3 accumulator has a boost valve 428 which is disposed in a support located within the valve body. The boost valve is seated on the end of coil spring 430 which extends from a pocket formed in an accumulator piston 432 movably mounted in the valve body. The accumulator piston is urged toward the boost valve or the upshift position by a spring 434. Drive line pressure from line 184 is fed into the chamber 436 to provide a downshift bias on the accumulator piston.

The accumulator piston is so designed that when it is to the full left position, it fully compresses the spring 430 and forces the boost valve and regulator valve to the full left position. When drive line pressure has forced the accumulator piston to the right which is the downshift position, the spring 434 will be fully compressed. The 2-3 accumulator line 400, port 426 and converter clutch branch line 418 are pressurized with converter charge pressure fed to the 2-3 shift valve through line 118. The 2-3 accumulator line and the converter branch line 418 are also connected through the 3-2 shift check valve 422. The converter clutch circuit 61 is therefore pressurized with converter pressure releasing the converter clutch. When a 2-3 shift is signaled by the 2-3 shift valve 354, the 2-3 accumulator line 400 is exhausted through exhaust 401 in the 2-3 shift valve; the 3-2 shift check valve 422 seals allowing the 2-3 accumulator valve to regulate converter pressure.

The 2-3 accumulator valve has a pressure chamber 438 connected by a third signal port to the third signal line 404 through check valve 442 and restriction 446. When chamber 438 is fed with third signal pressure equalizing pressure forces on the accumulator piston 432, the spring 434 pushes the accumulator piston to the left-hand position. The springs 434 and 430 must be selected so that the accumulator piston, acting through the boost valve can push the regulator valve 408 to the far left-hand position so that the 2-3 accumulator port 426 is open to exhaust the converter clutch circuit 61 completely so that the converter clutch full capacity can ultimately be attained. FIG. 3 illustrates the clutch apply sequence as controlled by the 2-3 accumulator valve.

This graph shows the clutch 55 disengaged by converter pressure $P_c$ until the 2-3 shift valve signals an upshift and clutch engagement at point 1. The third signal line 404 is pressurized with drive line oil and the chamber 438 fills with oil flowing through flow control construction 446; the chamber expands while the converter feed restrictor valve 162 opens the supply of oil to the converter through converter feed line 118 as the restrictor valve element 460 is moved to the left against spring 462. At point 2 where clutch engagement has been made, the accumulator piston has moved the regulator valve to a far left position to fully open the converter clutch line 61 to exhaust through line 400 providing for the full torque transmitting capacity of clutch 55. Thus it can be seen that the accumulator system controls the clutch apply in terms of drive pressure which is sensitive to engine torque and vehicle speed as well as being sensitive to the two calibration springs 430 and 434. This system is not sensitive to converter pressure which is not easy to control in a transmission. In this control system the clutch is fully released prior to point 1 and engaged with full capacity after point 2. The engagement time is established by the restriction 446 in the third signal line 404, the accumulator valve oil volume, and springs 430 and 434. This slope of the converter clutch pressure is controlled by the rate of spring 430. During downshifts, the accumulator valve system is bypassed by the shift check valve 422 and restriction 420.

The 3-4 shift or forward clutch control valve 216 consists of three valves formed by control valve elements 470, 472 and a shift valve element 474. The control valve 472 has end chamber 475 connected to converter feed line 118 so that converter feed pressure operates on the large area of the land of control valve element 472. This pressure is connected to a chamber 478 on the left side of this spool by a flow control passage in the land. Chamber 478 is connected to an exhaust 480 through a line controlled by a solenoid operated valve 484. The solenoid of this valve is controlled by electric switch 485. When the switch is open the solenoid is deenergized and the exhaust 480 is sealed so that the transmission can shift into fourth range if modulator pressure is less than a set minimum. When the switch 485 is closed the solenoid is energized and the chamber 478 is exhausted through the open exhaust 480. A spring in chamber 478 urges the valves toward the right. When the solenoid is energized, exhaust 480 is opened and chamber 478 is evacuated, the valve element 472 will be moved to the left by pressure in chamber 475 pushing 3-4 shift control valve 470 to its full left position compressing coil spring 481. Thus the solenoid, when energized, deactivates the 3-4 valve system so that shifts to fourth cannot be made and when deenergized makes the selection of the fourth operating gear possible.

The second control valve 470 is a simple two position valve; however, it can only function when the first control valve element 472 is in the right-hand position with chamber 478 pressurized. Valve 470 is urged to the left by a control pressure fed through a control line 482 to a chamber 483 at one end of valve 470. This control pressure holds the control valve element 470 in its full left position when it is above a predetermined pressure level and allows it to return to the full right position when it is below this selected pressure level. When valve 470 is in its left position, drive line pressure from line 184 is connected to an intermediate port 486 which is connected to a branch line 488 leading through a check valve 490 to a pressure chamber 492 at the end of the 3-4 shift valve element 474 so that this valve cannot upshift when this chamber is pressurized. The check valve also connects the branch line 488 to the intermediate line 186. If the shift control valve 470 were in its right-hand position, chamber 492 of the shift valve element 414 is connected to the converter clutch line 61 through branch line 488 and check valve 490. A 3-4 shift could now occur providing a sufficient governor pressure supplied through line 200 to a pressure chamber 494 which is available to counteract the force of the spring disposed in chamber 492 urging the 3-4 shift valve element 474 to the left. For a 3-4 shift, it is necessary that the converter clutch line 61 be exhausted signaling that the transmission is completely shifted into third gear. It can, therefore, be seen that three requirements must be met before the 3-4 shift valve can signal a 3-4 shift when sufficient governor pressure is available. They are (1) the solenoid operated valve 484 must be deenergized, (2) control pressure must be below a predetermined pressure, (3) converter clutch system must be exhausted. The intermediate check 490 situated between the control valve element 470 and the shift valve element 474 will downshift the transmission out of fourth gear if manual intermediate or manual low range is selected.

The shift control valve element 474 has three main functions. In the downshift position, as shown, modulator pressure from line 210 which is a function of engine torque only, is connected to the control line 482. This allows 3-4 shifts to only take place at very low engine torques. In this position of valve element 474 drive line 184 is connected to the forward clutch line 46 and this pressure holds the forward clutch engaged and keeps the servo 346 released since the 2-3 shift valve element 372 is in the upshifted position. The main pressure boost line 172 is connected to port 500 of the 3-4 shift valve. In the downshifted position the boost line 172 is exhausted through an exhaust 502. When conditions are such that an upshift occurs, the control line 482 is connected to the detent port 504 of detent-1 line 250. This keeps the control line 482 exhausted unless the detent-1 port at the detent valve 226 becomes pressurized which would move 3-4 control valve 470 over to the left and signal a 4-3 downshift. In the upshifted position of the shift valve element 474, the forward clutch line 46 is connected into exhaust 502 which will exhaust the chambers 41 and 42 to release the forward clutch. The servo control line 352 is exhausted since the 2-3 shift valve is in the upshifted position and the servo port 395 is connected to forward clutch port 407. Exhaust 502 is above the oil level since the forward clutch 32 is released and rotating in fourth gear.

In the upshifted position of the 3-4 valve element 474, the boost port 500 and boost line 176 become pressurized with oil from drive line 184. The first land of the shift valve element 474 has a larger diameter than the other lands to give it the required amount of shift hysteresis for subsequent downshifts. The boost line 172 connects to a boost check valve 508 where it is blocked from entry into the intermediate line 186 and is properly routed to the boost plug chamber 170 in the main pressure regulator valve system, therefore, boosting line pressure in fourth. The boost check valve 508 controls the boost plug 150 of the main pressure regulator valve system so as to boost line pressure in manual intermediate and low gear ranges and also in fourth gear.

There is a converter out restrictor valve 510 in addition to the converter feed restrictor valve 162. Both of these valves are two position systems. Third signal pressure from line 404 is fed to an end chamber 512 to force the valve element 514 to the left against spring 516 to block the flow of converter discharge fluid through valve 510 forcing the flow through flow control restriction 518 to a cooler 520 and a lubricant passage 522. When oil flow through the converter is controlled by the restriction 518 bypassing valve 510, the converter feed restrictor valve 162 opens the converter feed line 118 since third signal pressure pushes restrictor valve element to the illustrated position.

For automatic drive, the vehicle operator by actuating the manual control, places the manual valve element 180 in the automatic drive position D. In this position regulated main line pressure is fed through the manual valve to the drive line 184. Since governor pressure is low and torque demand is high, all of the shift valve elements will be in their downshifted position. Under these conditions the forward clutch line 46 and forward clutch chambers 41 and 42 are fed with drive line oil through the 3-4 shift valve to effect engagement of the forward clutch 32. With forward clutch 32 engaged, the sun gear 48 will be driven forwardly. The one-way brake 90 automatically engages to hold the ring gear for reaction to condition the transmission for forward low speed operation.

The converter clutch 55 is released in low range since the regulator valve element 408 of the 2-3 accumulator control valve supplies the converter clutch port 416 and line 61 with regulated converter feed pressure. With regulated pressure fed by line 61 into the converter by way of clutch release chamber 59 clutch 55 is disengaged.

There is no feed of oil to the converter through line 118 and passage 120 at this time since the converter feed restrictor valve element 460 is blocking feed line 118 in the absence of third signal pressure in line 404. Fluid exiting from the converter goes through passage 124, the converter out valve 510 and through the cooler to lubrication passage 522.

As vehicle speed increases and torque demand decreases the 1-2 shift valve is forced by increasing governor pressure to the upshifted position. In this position of the 1-2 valve element, drive line oil through port 344 is connected to the 1-2 clutch line 114. This oil is routed to the 1-2 accumulator 360 whose piston moves to the left to increase its volume to calibrate the shift as oil fills intermediate chamber 112 so that piston 110 effects the engagement of intermediate brake 108. The forward clutch 32 is still engaged since the 3-4 shift valve is in the downshift position. With clutch 32 and brake 108 engaged the gearset will be conditioned for second speed drive. One-way clutch 106 is locked and one-way brake 90 is overrunning as described.

In second range automatic drive 1-2 clutch oil is fed from the upshifted 1-2 shift valve via line 114 into the apply chamber 345 of the servo of brake band 103, however, this does not effect brake band apply since the release chamber 348 is fed with oil from line 352 connected to the RND line 192 when the 2-3 shift valve is in the downshifted position. As in low range the converter is fed through the converter clutch line 61.

As torque demand further decreases and vehicle speed further increases, the 2-3 shift valve 372 upshifts. In the upshifted position of the valve element 372, pressure from drive line 184 is connected to the third signal port 402 and third signal line 404. The 2-3 accumulator line 400 becomes open to the exhaust 401. When the third signal line is pressurized, the 2-3 accumulator valve shifts in response to third signal pressure in chamber 438 so that converter clutch line 61 is connected to 2-3 accumulator line 400 and is exhausted through exhaust 401 in the 2-3 valve. The third signal pressure acts on the end land of the converter feed restrictor valve element 469 to shift that valve so that a converter feed is established in line 118. This pressure is transmitted by passage 120 into the converter inlet. The converter out restrictor valve element 514 is shifted so that the converter discharge into passage 124 is fed through the restriction 518 into the cooler 520 and then into the lubrication passage 522. With the converter clutch chamber 59 and converter clutch line 61 open to the exhaust 401 of the 2-3 shift valve and with the converter being fed through converter feed line 118 the clutch 55 will be engaged by the forces exerted on plate 54 by converter pressure and that of springs 58. With clutch 55 engaged there will be mechanical drive to the ring gear 50 of the rear gear unit.

Since the 3-4 shift valve is still in downshifted position, the forward clutch line 46 is connected to the drive line to pressure the chambers 41 and 42 and maintain the engagement of the forward clutch 32. With forward clutch 32 applied in addition to the front clutch 55 the gearset 38 is driven hydraulically and mechanically to provide a 1:1 split torque ratio.

Under conditions such as open highway cruising the 3-4 shift may be desired for high economy operation. This selective shift is made possible by opening switch 485 so that the solenoid is deenergized to allow the 3-4 shift valve to upshift. The forward clutch apply chambers 41 and 42 and line 46 are exhausted through exhaust 502; the forward clutch 32 disengages. At this time brake band 103 engages drum 94 to hold sun gear 70 for reaction since the servo release chamber 348 is exhausted. This occurs because the 2-3 shift valve is upshifted and the servo line 352 is connected by the 2-3 shift valve element with the forward clutch line 46. The upshifted 3-4 shift valve element 474 exhausts the servo release oil through the connection of forward clutch line 46 with exhaust 502.

Since the shift valve element 310 of the 1-2 shift valve is in the upshifted position as in second and third, drive line oil is connected to intermediate clutch port 338 and line 114. With servo control chamber 348 exhausted, pressure fed by line 114 to servo chamber 345 effects the engagement of band 103 as well as the intermediate brake 108.

As will be appreciated, this control will provide for automatic downshifting in response to increasing torque demand and decreasing signals by the movement of the respective shift valves to their downshift positions.

For manual intermediate drive, the manual valve is moved to the $L_1$ position. In this position the manual valve connects pressure from main line 142 to drive line 184 and intermediate line 186. The low range drive line is exhausted through passage 187 and exhausts 188. Also, the RND-line 192 and reverse line 87 are connected to exhausts 188. Under these conditions, pressure from intermediate line 186 acts on the end land of 2-3 shift valve element 372 to urge it to the downshifted position and also on boost plug 150 raising minimum line pressure. The servo control chamber 348 is exhausted since servo control line 352 is connected by the downshifted 2-3 shift valve element to the RND-line 192 which is opened at the manual valve to exhaust. Intermediate pressure is effective in chamber 492 of the 3-4 shift valve to urge the 3-4 shift valve element 474 to the downshifted position so that pressure from drive line 184 is connected to the forward clutch line 46 to effect engagement of forward clutch 32. Drive line oil is connected to the 1-2 clutch line 114 since the 1-2 shift valve is in the upshifted position. This effects the engagement of the intermediate brake 108.

For manual low range, the manual valve is set in the $L_2$ position so that regulated pressure is supplied to drive line 184, intermediate drive line 186 and low range line 182. At vehicle speed below a predetermined speed the low control valve element 290 is shifted by the coil spring to open the low range port 298 to port 300 of manual low line 302. This oil is fed into the chamber 308 of the 1-2 shift valve. The force exerted by the pressure oil in this chamber moves the shift valve element 310 to the downshifted position and the shift control valve element 312 to the upshifted position. Under these conditions manual low pressure is fed into port 326 of the low and reverse line 87 to effect the engagement of brake 78.

The forward clutch 32 is applied since the intermediate line 186 is pressurized in this manual valve position to downshift the 3-4 shift valve element 474 by pressurizing chamber 492. In this position the 3-4 shift valve connects the drive line to forward clutch line 46.

For reverse, the manual valve is moved to the position R to connect reverse line 87 and the RND-line 192 to regulated main line pressure. Reverse oil from line 87 is fed into reverse chamber 86 to effect the engagement of low and reverse brake 78. The 1-2 shift valve elements 310 and 312 being downshifted will feed reverse line oil from line 87 into port 326 so that low and reverse chamber 84 will be pressurized to increase the torque capacity of brake 78. Since reverse clutch line 87 is connected with reverse chambers 98 and 99, the reverse clutch 102 is applied.

Line pressure is boosted to increase the capacity of the engaged friction devices in reverse. This pressure boost occurs because reverse line pressure is fed into chamber 149 and the modulator trim and reverse boost valve element 148 is forced by reverse pressure into biasing engagement against the main regulator valve element so that it regulates a higher main line pressure line 142.

The detent valve element 228 is mechanically connected to the throttle linkage and is appropriately moved in direct response to throttle pedal movement to provide for 3-2 and 4-3 part throttle downshifts and wide open throttle 3-2 and 2-1 downshifts.

A 3-2 part throttle downshift can be made below a predetermined vehicle speed, 50 m.p.h. for example. At light throttle the detent valve is released and the 3-2 part throttle line 262 is exhausted through exhaust port 261. When an increased torque demand is made, the detent valve element 228 can be moved to the 3-2 position so that the 3-2 part throttle line 262 is connected to modulator trim pressure line 218. Pressure fluid is fed through the 3-2 part throttle line 262 to port 380 in the 2-3 shift valve. The pressure buildup in the associated pressure chamber forces the 3-2 control valve element 370 and the 2-3 shift valve element 372 to the downshifted position. In this position the third signal line is exhausted so that the converter feed restrictor valve blocks the supply of fluid to the converter through converter feed line 118. However, the converter is supplied with oil through feed line 61 since line 118 is connected by the 2-3 shift to the accumulator line 400. The 2-3 accumulator control valve element shifts so that converter clutch feed line 61 and feed passage 60 is connected to converter feed line 118. The supply of pressure fluid into clutch chamber 59 effects disengagement of clutch 55. The intermediate brake 108 is applied since the 1-2 shift valve element is in the upshift position and drive line pressure is connected to the 1-2 clutch line 184. The forward clutch is applied since the 3-4 shift valve is in downshifted position and drive line oil is fed into forward clutch line 46. Modulator shift valve oil fed from the detent valve through line 258 to the 2-3 shift valve opposes governor pressure so that the shift schedule is changed.

The 4-3 part throttle downshift can be obtained by moving the detent valve to the 4-3 of D-1 position. In this valve element position, the 3-2 part throttle line 262 is connected to port 225 and is fed with modulator trim pressure. Also, the modulator shift valve line 258 is fed with modulator trim pressure. The detent-1 line is fed a regulated pressure from the detent regulator valve 254.

The 3-4 shift valve element is in upshifted position and detent regulator oil is fed by the detent-1 line to the chamber 217. This oil is then fed into the control line 482 which leads to control chamber 483 between the control valve elements 470 and 472. The control valve element 470 is downshifted to connect drive line pressure to the intermediate branch line 488. Drive pressure in chamber 492 of the 3-4 shift valve causes this valve to downshift. The intermediate check ball seats to prevent any other flow in this line.

With the 3-4 shift valve downshifted, drive line oil is again fed to the forward clutch line 46 to apply forward clutch 32. The servo 346 for the brake band 103 is released by the supply of forward drive oil being fed into servocontrol line 352 in the 2-3 shift valve. The 2-3 accumulator stays upshifted so that converter clutch line 61 is connected to the 2-3 accumulator line 400 which is open to exhaust 401 at the 2-3 shift valve. This exhaust of the converter clutch control chamber 59 allows converter pressure to effect engagement of the front clutch 55. The clutch 55 is engaged in both direct and overdrive. The intermediate clutch is also engaged through the upshifted 1-2 shift valve.

Wide open throttle 4-2, 3-2 and 2-1 downshifts are obtained by placing the detent valve in the D-2 position. The 3-2 part throttle line 262 remains connected to the modulator trim line 218 so that the 2-3 shift valve element is urged by the shift control valve 370 to the downshifted position. The modulator shift valve line 258 is connected to the modulator trim line 218. The detent-2 line 246 is connected to the detent regulator pressure fed through line 276; detent regulated pressure is fed by the detent-2 line to the 1-2 and 2-3 shift valves. In the upshifted position this pressure is fed to the shift control valve elements 312 and 370 to urge them toward the downshifted position. If the vehicle is cruising in direct drive, a wide open throttle causes a 3-2 downshift above a predetermined speed and a 3-1 downshift below that speed. If the vehicle were operating in fourth gear, a 4-2 downshift would be accomplished.

This invention is not limited to the details of the construction shown and described for purposes of illustrating the invention for other modifications will occur to those skilled in the art.

What is claimed is:

1. In a transmission having an input and an output, a hydrodynamic torque transmitting unit having an input rotor operatively connected to said input and having an output rotor, a change speed-gearing unit drivingly connecting said output rotor and said transmission output, torque-transmitting means drivingly connected to said change speed-gearing unit, selectively engageable clutch means disposed within said hydrodynamic unit for drivingly connecting and for disconnecting said torque-transmitting means and said input, hydraulically operated motor means within said hydrodynamic unit for effecting the engagement and disengagement of said clutch means, a plurality of friction drive establishing devices including a forward drive clutch and a brake operatively connected to said gearing unit and selectively engageable to produce a plurality of different input/output speed ratios; control means for said friction drive establishing devices and said motor means of said clutch means comprising shift valve means responding to signals proportional to the rotational speed of said output and opposing decreasing signals representative of torque demand from said transmission by shifting to exhaust said forward drive clutch and apply said brake to condition said transmission for its smallest input/output speed ratio and further to produce a control signal to effect exhaust of said motor means so that fluid in said hydrodynamic unit effects engagement of said clutch means for an all mechanical drive.

2. The transmission defined in claim 1 wherein said hydrodynamic unit comprises a torque converter having a housing operatively connected to said input and to said input rotor, said clutch means comprising a friction surface on the inside of said housing and a cooperating friction surface on said motor means, support means mounting said motor means for sliding axial movement to effect engagement and disengagement of said clutch means, said motor means and said housing cooperating to form a pressure chamber operatively connected to said controls for controlling the engagement and disengagement of said clutch means.

3. The transmission defined in claim 2 and further including spring means disposed within said converter and contacting said motor means for urging said motor means in a direction for engagement of said clutch means.

4. In a transmission having an input and an output, a hydrodynamic torque converter having a housing with pump means operatively connected to said input and having turbine means, a change speed gearing unit drivingly connected to said output, first torque transmitting means drivingly connecting said turbine to said gearing unit, second torque transmitting means drivingly connected to said gearing unit, hydraulically operated forward drive clutch means operatively disposed in said first torque-transmitting means and selectively engageable to permit said turbine means to drive said gearing unit, brake means operatively connected to said gearing unit selectively engageable to produce the smallest torque ratio when said second torque-transmitting means is driven, hydraulically operated clutch disposed within said housing of said converter engageable by fluid within said converter to provide for the mechanical drive of said gearing unit by said transmission input and disengageable to provide for the all hydraulic drive of said gearing unit by said torque converter when said forward drive clutch means is engaged, a source of regulated fluid pressure, a plurality of shift valve means operatively connected to said source and to said clutch means for upshifting and downshifting said gearing unit, one of said shift valve means responding to an increase in speed of said transmission output and a decrease in torque demand by upshifting to effect engagement of said clutch within said converter, and another shift valve means positionable to supply a pressure fluid to said forward drive clutch means to effect the engagement thereof and to supply a pressure fluid to said first mentioned valve for subsequent supply to said brake means to prevent the engagement thereof, said second shift valve means having exhaust means for exhausting said forward drive clutch means and said brake means in the upshift position of said second shift valve means to effect disengagement of said clutch and engagement of said brake to provide for the smallest torque ratio drive.

5. The transmission defined in claim 4, a hydraulically operated servomotor for said brake means, fluid passage means operatively connecting said servomotor to said first-mentioned valve means, and an additional shift valve means operatively connected to said source and to said brake means to supply pressure fluid to said brake means to effect release of said brake means in response to the upshift upshifting of said last and second-mentioned shift valves.

6. In a transmission having an input and an output, a hydrodynamic torque-transmitting unit having an input rotor operatively connected to said input and having an output rotor, a change speed gear unit drivingly connecting said output rotor and said transmission output, torque-transmitting means drivingly connected to said gear unit, selectively engageable clutch means for drivingly connecting and for disconnecting said torque-transmitting means and said transmission input, hydraulically actuated motor means for operating said clutch means, a source of fluid pressure, first feed means operatively connected to said source for feeding said hydrodynamic unit, shift valve means operatively connected to said source and positionable in a first position in response to predetermined torque to route converter feed oil to said motor means to effect disengagement of said clutch and control valve means responding to a signal pressure from said shift valve means by routing fluid from said clutch to exhaust at said shift valve means to permit hydrodynamic unit pressure to effect engagement of said clutch.

7. In a transmission having an input and an output, a hydrodynamic torque converter having a housing with pump means operatively connected to said input and having turbine means, a change speed planetary gear unit having first and second inputs and having an output drivingly connected to said transmission output, a plurality of friction drive establishing devices operatively connected to said gear unit which are selectively engageable to produce first, second and third input/output speed ratios, a fluid-operated clutch disposed in said converter and engaged by fluid within said converter for drivingly connecting said transmission input with said second input of said gearset, means for supplying fluid to said converter for releasing said clutch, a source of fluid pressure, a plurality of shift valves operatively connected to said source and to said friction drive establishing devices for shifting said transmission between predetermined input/output speed ratios, an accumulator valve means operatively connected to said clutch to control the engagement thereof, said accumulator valve having an accumulator chamber for collecting a signal pressure from said shift valve means and subsequently shifting to route oil from said converter clutch to said shift valve means and to an exhaust whereby said converter clutch is engaged by working fluid within said converter.

8. In a transmission having an input and an output, a hydrodynamic torque converter having a housing with pump means operatively connected to said input and having turbine means, a change speed planetary gear unit having first and second inputs and having an output drivingly connected to said transmission output, a plurality of hydraulically actuated friction drive establishing devices operatively connected to said gear unit which are selectively engageable to produce a plurality of different input/output speed ratios, a fluid-operated clutch disposed within said converter and engageable by fluid therein for drivingly connecting said transmission input with said second input of said gearset, a source of fluid pressure, shift valve means responding to predetermined operating signals of said transmission for routing operating oil to said clutch within said converter to effect the disengagement thereof to provide for all hydraulic drive of said gear unit by said converter, control valve means operatively connected to said shift valve means and movable in response to a signal pressure from said shift valve means to connect said clutch means with an exhaust in said shift valve means to effect the rapid exhaust of said clutch and the engagement of said clutch by working fluid within said converter.

9. In a transmission having an input and an output, a hydrodynamic torque converter having pump means driven by said input and having turbine means, a planetary gear unit operatively connected to said output, torque transmitting means drivingly connecting said turbine means to said planetary gear unit, a plurality of friction drive establishing devices operatively connected to said gear unit and engageable to condition said transmission for a plurality of forward drive input/output gear ratios, said torque converter having a housing connected to said pump means and driven by said input, clutch means operatively disposed in said housing, a torque-transmitting shaft drivingly connecting said clutch means and said planetary gear unit, a clutch support hub secured to said torque-transmitting shaft, a pressure plate having a friction surface engageable with said housing forming a portion of said clutch means mounted for longitudinal sliding movement on said support, said plate and said housing forming a chamber therein, control means for said transmission including first means for feeding converter charge fluid to said chamber to effect movement of said plate from engagement with said housing to effect disengagement of said clutch means and the exhaust fluid from said chamber, and including second means for feeding fluid into said converter when said first means is exhausting fluid from said converter so that converter pressure effects engagement of said clutch means.

10. The transmission defined in claim 9 wherein said controls include a plurality of shifter valves operatively connected to said friction drive establishing device and an accumulator valve for controlling the engagement of said clutch, said valve having an accumulator piston which forms a pressure chamber connected with said shift valve, said chamber becoming charged with pressure fluid from said valve when said shift valve upshifts said accumulator piston operating on a boost valve to move the regulator valve to a position whereby the converter clutch line is opened to the two-three accumulator line and is exhausted at shift valve to calibrate the engagement of said clutch.

11. In an automatic transmission having an input and an output, a hydrodynamic unit having an input rotor and having an output rotor, a housing for said unit driven by said input and drivingly connected to said input rotor, change speed gear means drivingly connecting said output rotor to said transmission output, a plurality of friction drive establishing devices operatively connected to said gear means and selectively engageable for changing the input/output speed ratio of said transmission, a clutch in said housing of said hydrodynamic unit, said clutch having clutch drive means driven by said input, and clutch-driven means drivingly connected to said gear means, a supporting plate forming part of said driven means and cooperating with said housing to form a pressure chamber, control means for said friction drive establishing devices and said clutch means comprising a source of fluid pressure, a plurality of shift control valve means operatively connected to said source and said friction drive establishing devices, torque demand and output speed signal means operatively connected to said shifter valve means for upshifting and downshifting said valve means, an accumulator valve means operatively connected to said source and at least one of said shift valve means, said accumulator valve having regulator means for supplying regulated pressure to said chamber to effect disengagement of said clutch means and to feed said hydrodynamic unit, said accumulator valve having an accumulator valve element movable to a predetermined position to effect the exhaust of said chamber so that pressure within said unit will effect the engagement of said clutch.

12. The automatic transmission defined in claim 11, said clutch-driven means comprising a supporting hub having an annular shoulder, said supporting plate having a sleeve portion for mounting said plate on said supporting means, drive means for drivingly connecting said plate and said supporting means while permitting axial movement of said plate, and spring means disposed for urging said clutch drive and driven means into drive engagement with each other.

* * * * *